(12) United States Patent
Beasley

(10) Patent No.: US 6,957,938 B1
(45) Date of Patent: Oct. 25, 2005

(54) CARGO TIE-DOWN SYSTEM

(76) Inventor: Dominick Beasley, 770 Jackpen La., King William, VA (US) 23086

( * ) Notice: Subject to any disclaimer, the term of this patent is extended or adjusted under 35 U.S.C. 154(b) by 0 days.

(21) Appl. No.: 10/969,311

(22) Filed: Oct. 21, 2004

(51) Int. Cl.[7] ................................................. B60P 7/08
(52) U.S. Cl. ....................................... 410/100; 410/97
(58) Field of Search ............................. 410/12, 97, 100, 410/103; 254/214–215, 219, 241, 278, 294, 254/295, 298, 299, 342, 346, 365; 248/499; 24/62 CD, 302, 68 BT, 265 CD

(56) References Cited

U.S. PATENT DOCUMENTS

| | | | | |
|---|---|---|---|---|
| 578,855 A | * | 3/1897 | Bradley | ....................... 410/100 |
| 3,827,650 A | | 8/1974 | Stevens et al. | |
| 4,842,458 A | * | 6/1989 | Carpenter | ....................... 410/3 |
| 5,553,981 A | | 9/1996 | Braden | ....................... 410/116 |
| 5,800,105 A | * | 9/1998 | Stump | ....................... 410/103 |
| 5,876,167 A | * | 3/1999 | Selby | ....................... 410/97 |
| 5,961,263 A | * | 10/1999 | Nunez | ....................... 410/103 |
| 6,059,499 A | * | 5/2000 | Bird | ....................... 410/103 |
| 6,152,664 A | * | 11/2000 | Dew et al. | ....................... 410/100 |
| 6,290,440 B1 | | 9/2001 | DiViccaro | ....................... 410/103 |
| 6,663,328 B2 | * | 12/2003 | Schmidt et al. | ....................... 410/97 |
| 6,776,564 B1 | * | 8/2004 | Kiernan et al. | ....................... 410/23 |
| 6,851,902 B2 | * | 2/2005 | Stanley | ....................... 410/97 |

* cited by examiner

Primary Examiner—Stephen Gordon
(74) Attorney, Agent, or Firm—Donald R. Schoonover

(57) ABSTRACT

Freight or cargo is secured in place by a system that includes a central crank unit to which a proximal end of each of a plurality of cargo tie-down straps is connected. The central unit is placed on the cargo at a convenient location. The straps are each wound around rollers that are each connected to a main crank. The distal end of each of the cargo tie-down straps is anchored to the vehicle carrying the cargo and the main crank is operated to roll the straps into the central crank unit and to thereby tighten the straps around the cargo. A release unit releases the straps so the cargo can be removed when desired.

1 Claim, 2 Drawing Sheets

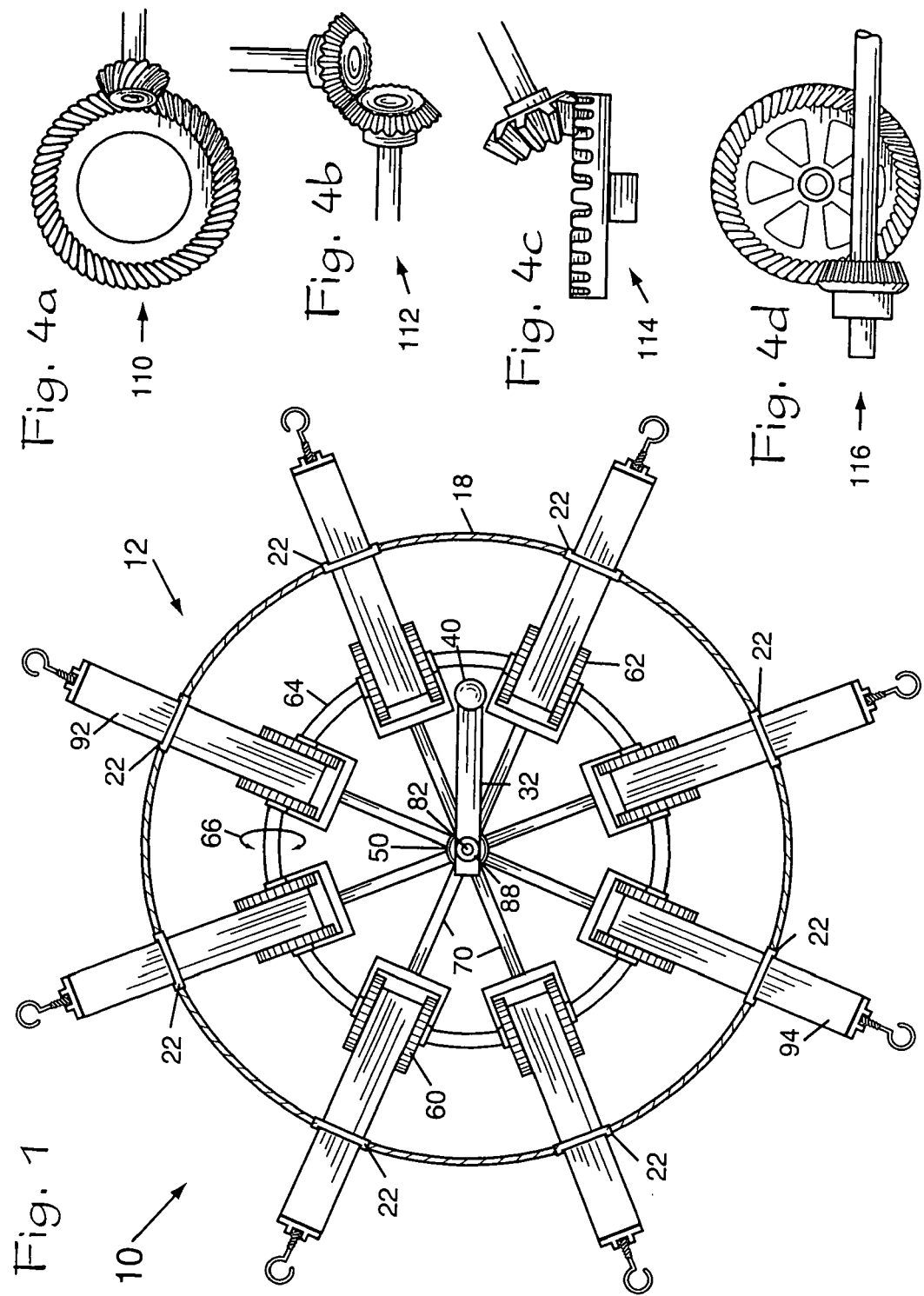

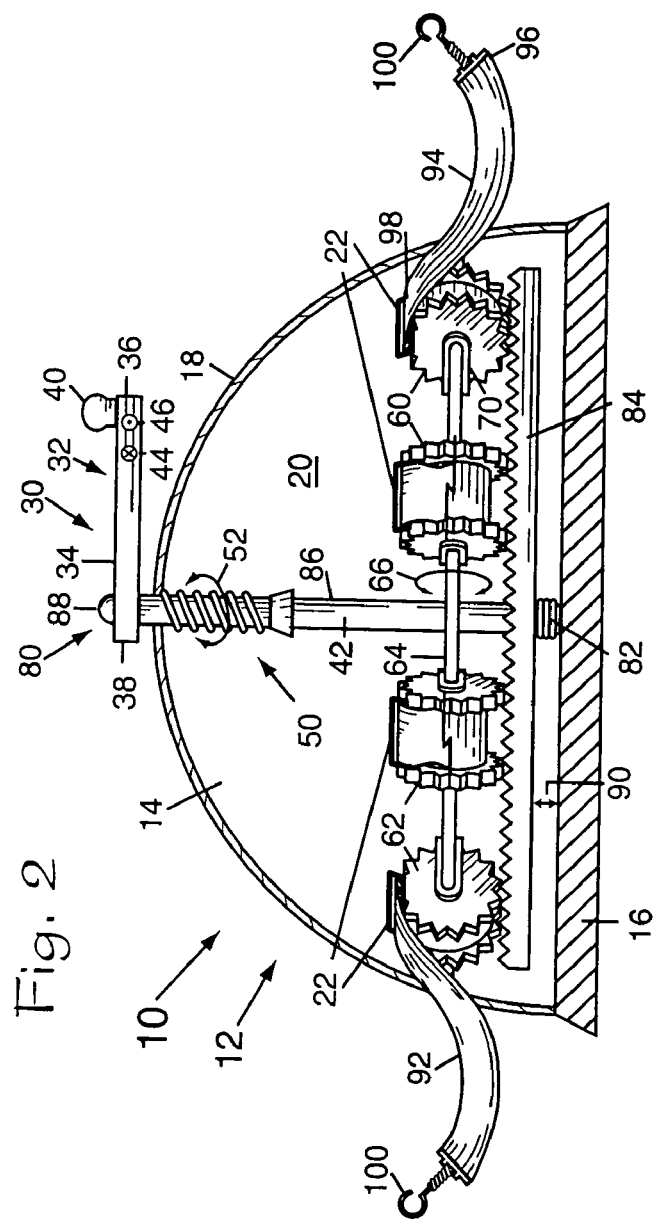
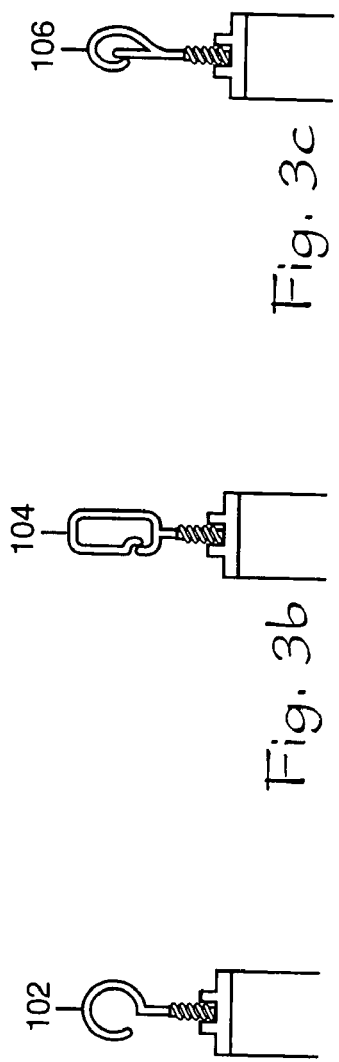

US 6,957,938 B1

CARGO TIE-DOWN SYSTEM

BACKGROUND OF THE INVENTION

1. Field of the Invention

The present invention relates to the general art of freight accommodation on freight carriers, and to the particular field of load lashing.

2. Description of the Related Art

Many people haul all types of cargo in the beds of trucks. This cargo can range from loose materials to neatly stacked materials. During transport, the materials, no matter how carefully they are initially stacked, can shift. Cargo shifting can be significant enough to cause some of the cargo to be in danger of falling out of the truck.

Therefore, there is a need for a load lashing unit which can securely and reliably hold freight or loads in place.

While the freight accommodation art contains several examples of load tie-down systems, these systems are often difficult and onerous to set up. Still further, many of the systems known to the inventor do not tie a load down from a plurality of locations. That is, many systems known to the inventor simply have cables or cords that stretch across a load and have each end anchored to the carrier. The cables, cords and/or straps are often parallel with each other and are located at spaced apart locations on the load. This is satisfactory for many purposes; however, the load may be able to slip under the tie-down straps in the direction of the spacing.

Therefore, there is a need for a load lashing unit which can securely and reliably hold freight or loads in place and which can be attached at various locations.

Still further, most of the load tie-down systems known to the inventor cannot easily adapt to a cargo load having a non-uniform shape. That is, if the cargo load has an unusual outer peripheral shape, a tie-down system of straps may not fit tightly on all side surfaces of the cargo load. This may cause some of the load to be loose.

Therefore, there is a need for a load lashing unit which can securely and reliably hold freight or loads in place and which can be attached at various locations and which can accommodate loads having unusual shapes and outlines.

Another problem with cargo tie-down systems known to the inventor is that each individual tie-down strap must be individually connected and anchored. This can be a time consuming process when two ends of each of a plurality of straps must be individually connected and anchored.

Therefore, there is a need for a load lashing unit which can securely and reliably hold freight or loads in place and which can be attached at various locations and which can accommodate loads having unusual shapes and outlines and which can be quickly set up.

PRINCIPAL OBJECTS OF THE INVENTION

It is a main object of the present invention to provide a load lashing unit which can securely and reliably hold freight or loads in place.

It is another object of the present invention to provide a load lashing unit which can securely and reliably hold freight or loads in place and which can be attached at various locations.

It is another object of the present invention to provide a load lashing unit which can securely and reliably hold freight or loads in place and which can be attached at various locations and which can accommodate loads having unusual shapes and outlines.

It is another object of the present invention to provide a load lashing unit which can securely and reliably hold freight or loads in place and which can be attached at various locations and which can accommodate loads having unusual shapes and outlines and which can be quickly set up.

SUMMARY OF THE INVENTION

These, and other, objects are achieved by a cargo tie-down unit which includes a central strap mount that has a plurality of cargo tie-down straps attached thereto. Each strap is attached to an individual roller and all of the rollers are connected to a main crank unit. Each strap has a distal end with an anchor hook thereon.

The central strap mount is placed on a cargo at a convenient location and the straps are pulled out of the central strap mount over the cargo. The distal ends of each strap are then anchored on the cargo carrier. The main crank unit is then operated to tighten down all of the straps. If there is an irregularity in the cargo shape, the central unit can be moved or may, in some cases, move itself, so that all of the straps will be tensioned.

The cargo tie-down unit is released by means of a release button on the main crank unit which disengages the main crank unit from the individual strap rollers thereby allowing those rollers to free wheel. The straps on the free-wheeling rollers can be pulled away from the cargo to release the cargo from the straps. Once the cargo is released from the straps, the straps can be released from their anchored locations and re-wound using the main crank unit which can be re-engaged after the straps have been released from the cargo and from the anchor locations.

Using the cargo tie-down unit embodying the present invention will permit cargo to be quickly and securely tied down even if the cargo has an unusual outline and the cargo can be tied down from a plurality of angles so it is not likely to slip out of the tie-down strap system.

BRIEF DESCRIPTION OF THE DRAWING FIGURES

FIG. 1 is an elevational view of a cargo tie-down unit embodying the present invention.

FIG. 2 is a top plan view of the cargo tie-down unit embodying the present invention.

FIGS. 3A through 3C show various hooks that can be used on straps associated with the cargo-tie-down unit of the present invention.

FIGS. 4A through 4D show various bevel gear combinations that can be used in the cargo tie-down unit of the present invention.

DETAILED DESCRIPTION OF THE PREFERRED EMBODIMENT

Other objects, features and advantages of the invention will become apparent from a consideration of the following detailed description and the accompanying drawings.

Referring to the Figures, it can be understood that the present invention is embodied in a cargo tie-down system 10 that achieves the above-stated objectives. The present invention eliminates the need to carry around a mess of bungee cords, ropes, or cables and eliminates fumbling to untangle a web of ropes which might otherwise cause injury from rope burns or snapping cords.

Cargo tie-down system 10 comprises a main unit 12 which is located in a convenient location with respect to a cargo load that is being carried on a vehicle, such as a truck or the like. One convenient location for unit 12 is on top of the cargo near the center of the bed of the vehicle. However, other locations can also be used without departing from the scope of the present disclosure.

Unit 12 includes a hollow housing 14, having a base 16 which can be rubber or the like if suitable, and a wall 18. Wall 18 is shown in FIG. 1 as being dome-shaped. An interior volume 20 is defined by base 16 and wall 18. A plurality of slots, such as slot 22, are defined through wall 18.

A main crank unit 30 is located on wall 18 and includes a hand crank 32 which is rotatably mounted on wall 18. Hand crank 32 includes a body 34 having a distal end 36 and a proximal end 38. A knob 40 can be located on distal end 36 to assist a user in grasping the hand crank 32. Hand crank 32 is rotatably mounted on wall 18 by an axle 42 to rotate into and out of the plane of the paper as viewed in FIG. 2 and as shown by directions 44 and 46. A main connection element 50 is connected to the hand crank 32 for rotation therewith in directions 52 which correspond to directions 44 and 46.

A plurality of strap rollers, such as strap rollers 60 and 62, are located in interior volume 20 of the hollow housing 14 and are rotatably mounted therein by elements such as axle 64 to rotate in directions 66. The rollers 60, 62 are moved by the action of the hand crank 32 in a direction as will be understood by those skilled in the art based on the teaching of the present disclosure.

A roller connection element, such as element 70, is associated with each strap roller 60, 62 and is connected to main connection element 50 for rotation therewith. Each strap roller 60, 62 is rotatably connected to the roller connection element 70 associated therewith to rotate in association with the main crank unit 30.

A release or retractable gear unit 80 is connected to main connection element 50 to release the main connection element 50 from all of the roller connection elements 70 when activated. The release unit 80 can include a movable pin and gear unit 82 in which a gear 84 is connected to a pin 86 that is, in turn, connected to button 88, to move in directions 90, when the pin 86 is moved. When gear 84 is in one position, it engages elements 70 to prevent elements 70 from moving and when gear 84 is in a second position, it is spaced apart from elements 70 thereby permitting elements 70 to move. Again, those skilled in the art will understand the details of the release button 88 based on the teaching of the present disclosure.

A plurality of retractable cargo tie-down straps, such as straps 92 and 94, are also included in unit 10. Each cargo tie-down strap 92, 94 has a distal end 96, a proximal end 98, and an anchor element 100 on the distal end 96. Various anchor elements can be used, as illustrated in FIGS. 3A through 3C, for anchor elements 102, 104 and 106. The anchor elements are attached to corresponding anchor elements on the vehicle carrying the cargo. As shown in FIGS. 3A–3C, the anchor elements are removably attached to the distal ends 96 of the tie-down straps 92, 94 so they can be changed as needed. Each cargo tie-down strap is fixed to one of the strap rollers 60, 62 and extends through a slot 22 in the housing 14.

To use unit 10, housing 12 is located on the cargo and the straps 92, 94 are pulled out of the housing 14 and are extended over the cargo. The straps 92, 94 are then anchored to the vehicle carrying the cargo. Hand crank 32 is rotated to tighten the straps 92, 94. The housing 14 may be able to move so that all of the straps 92,94 are fully tightened even though the outline of the cargo is non-uniform. Once the straps 92, 94 are sufficiently tightened, the release button 88 can be set to lock the rollers 60, 62 against rotation. Once the cargo is to be released, the release button 88 can be activated to release the rollers 60, 62 so the straps 92, 94 can be pulled out of the housing 14 and loosened sufficiently to release the cargo. Once the cargo has been unloaded, the release button 88 can be re-activated and the hand crank 32 rotated to draw all of the straps 92, 94 back into the housing 14. In other words, the straps are unhooked, the release button on top is pressed, and the retractable straps are returned to the housing.

The main connection element 50 can be attached to the roller connection elements 70 via bevel gearing systems such as shown at 110, 112, 114 and 116 in FIGS. 4A through 4D respectively so that rotation of hand crank 32 will be transmitted to the strap rollers 60, 62 as rotation of the strap rollers 60, 62. Other connections can be used without departing from the scope of the present disclosure.

It is understood that while certain forms of the present invention have been illustrated and described herein, it is not to be limited to the specific forms or arrangements of parts described and shown.

What is claimed is:

1. A cargo tie-down system comprising:
   (a) a main unit which includes
      (1) a hollow housing having a base and a wall, with an interior volume defined by the base and the wall, the housing further including a plurality of slots defined through the wall,
      (2) a main crank unit which includes a main crank rotatably mounted on the wall of the housing and a main connection element connected to the main crank for rotation therewith,
      (3) a plurality of strap rollers located in the interior volume of the hollow housing and being rotatably mounted therein,
      (4) a roller connection element associated with each strap roller and which is connected to the main connection element for rotation therewith, each strap roller being rotatably connected to the roller connection element associated therewith to rotate in association with the main crank unit, and
      (5) a release unit connected to the main connection element to release the main connection element from all of the roller connection elements when activated; and
   (b) a plurality of cargo tie-down straps, each cargo tie-down strap having a distal end, a proximal end, and an anchor element on the distal end, each cargo tie-down strap being fixed to one of the strap rollers and extending through a respective one of said slots in the housing of said main unit.

* * * * *